June 4, 1968  W. J. HILDEBRANDT ET AL  3,386,650
CONTROL MECHANISM
Filed Sept. 3, 1965   9 Sheets-Sheet 9
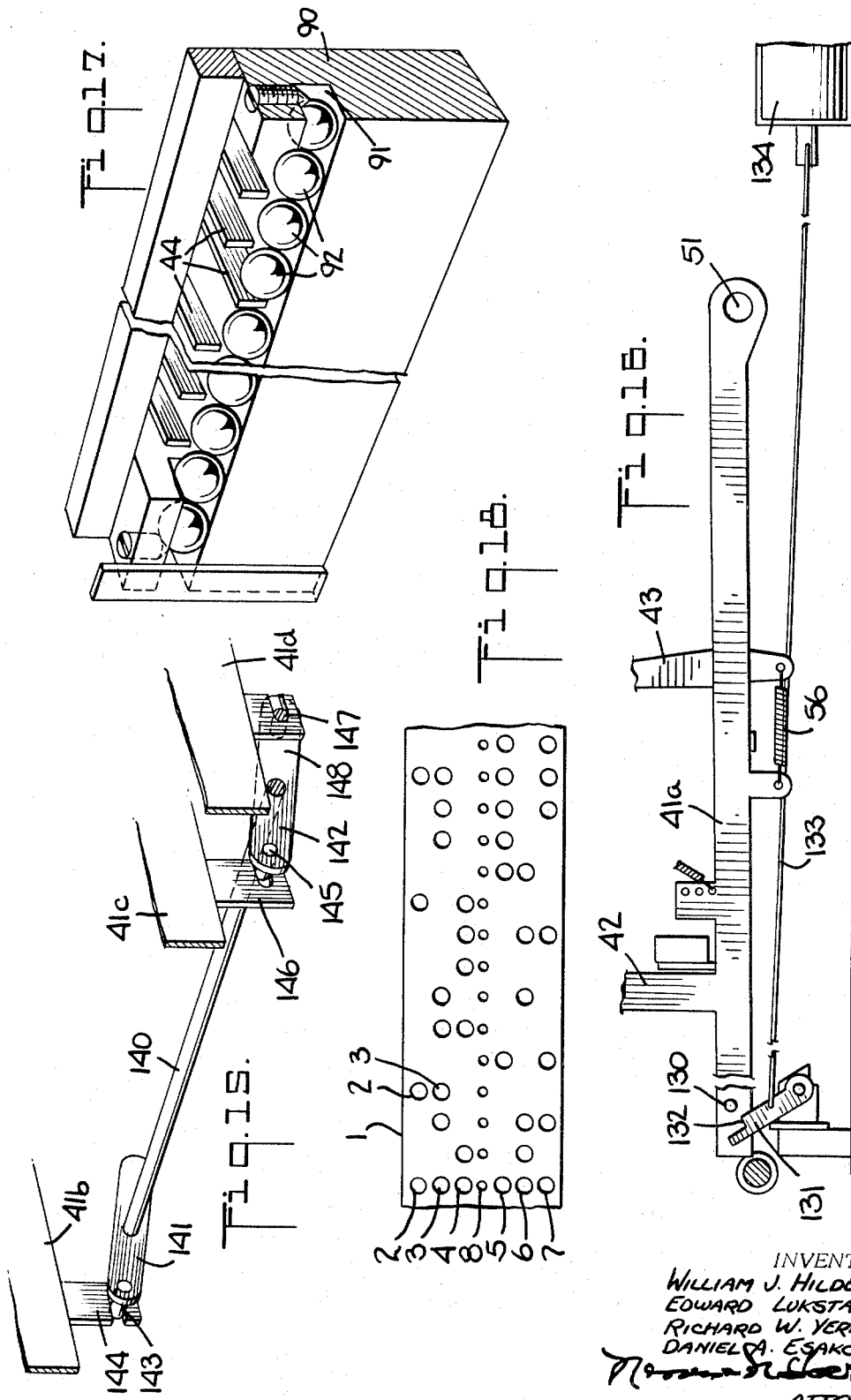
INVENTORS
WILLIAM J. HILDEBRANDT
EDWARD LUKSTAS
RICHARD W. YERKS
DANIEL A. ESAKOV
ATTORNEY United States Patent Office 3,386,650
Patented June 4, 1968

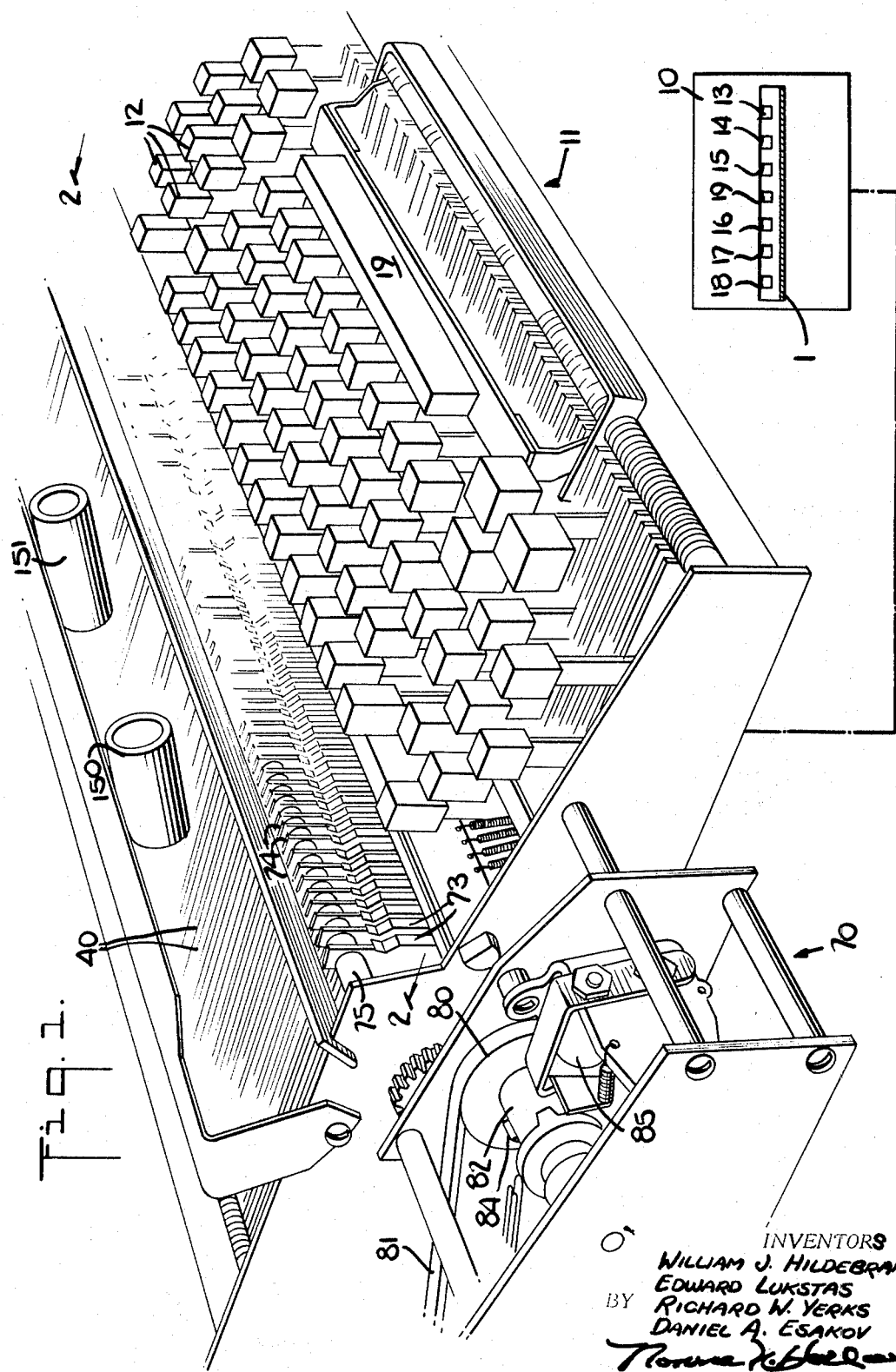

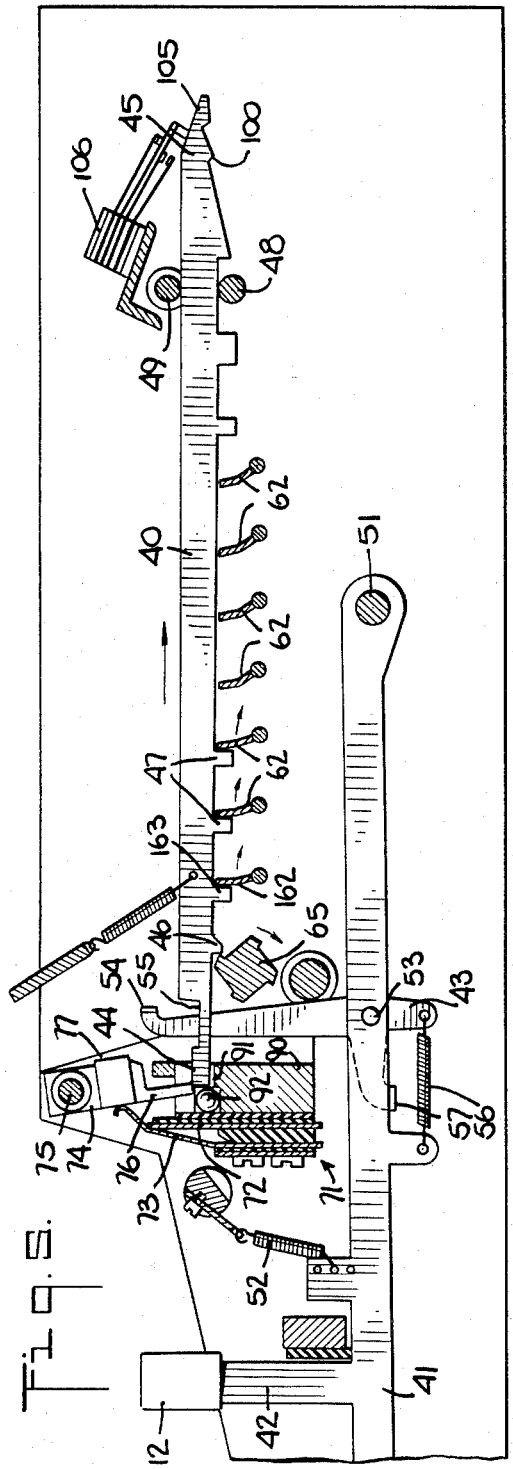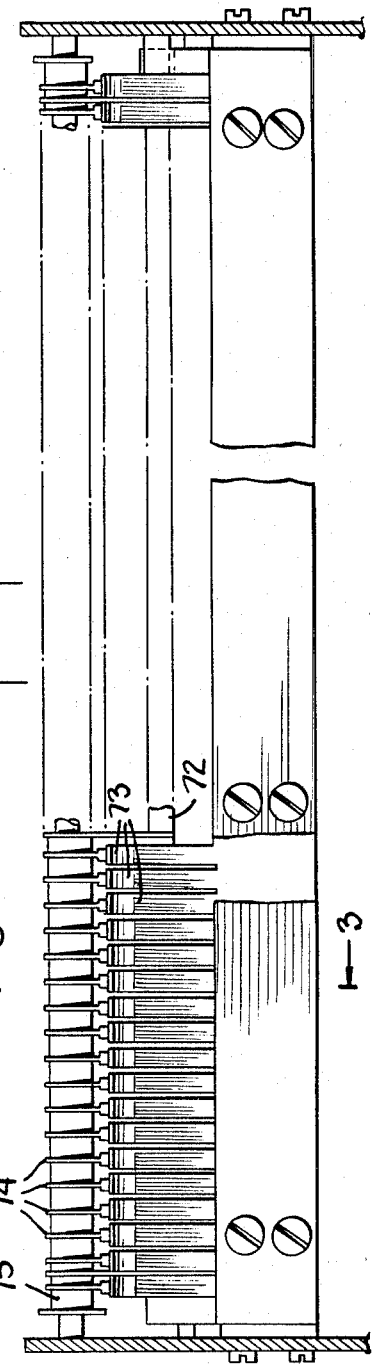

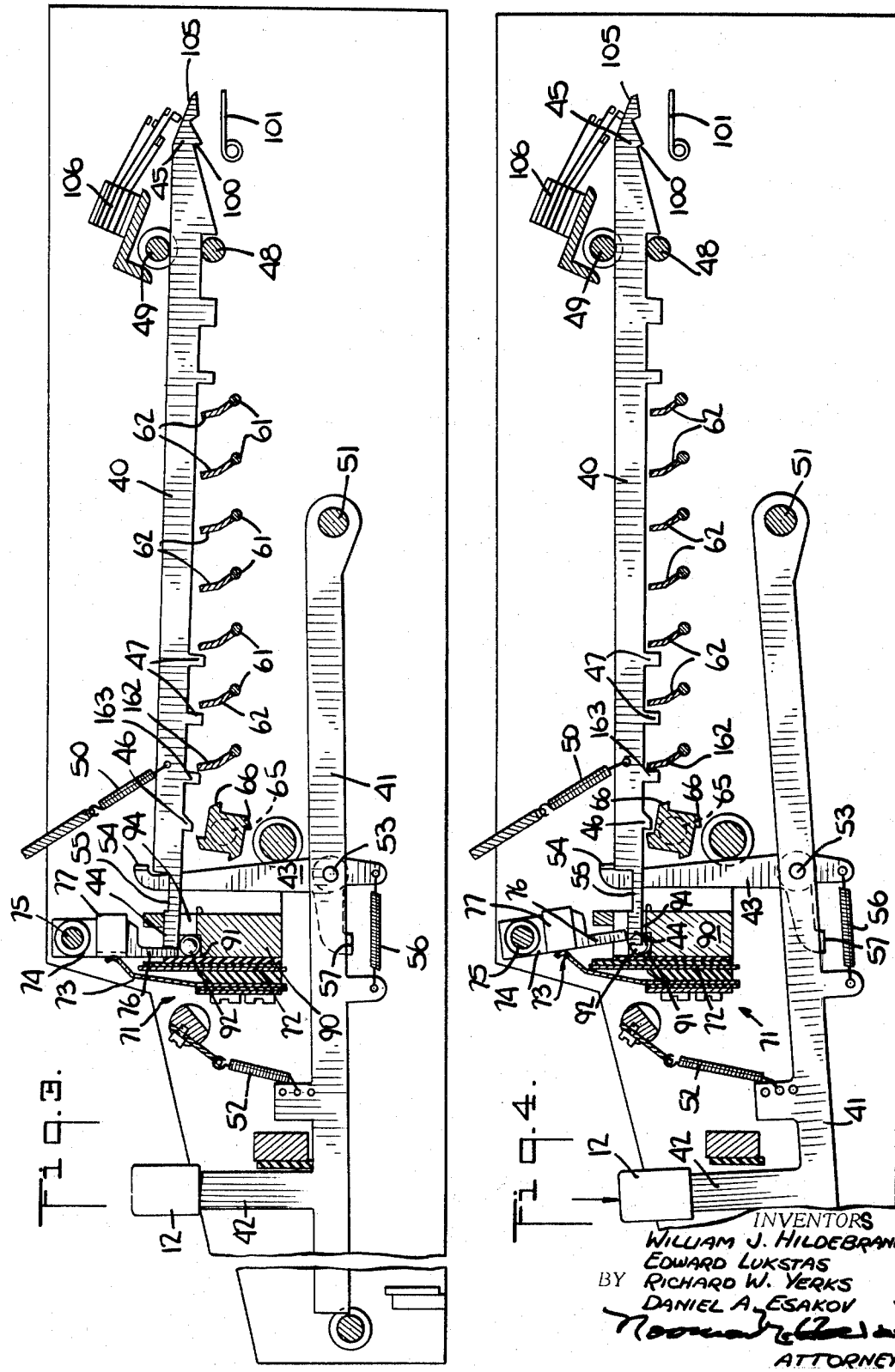

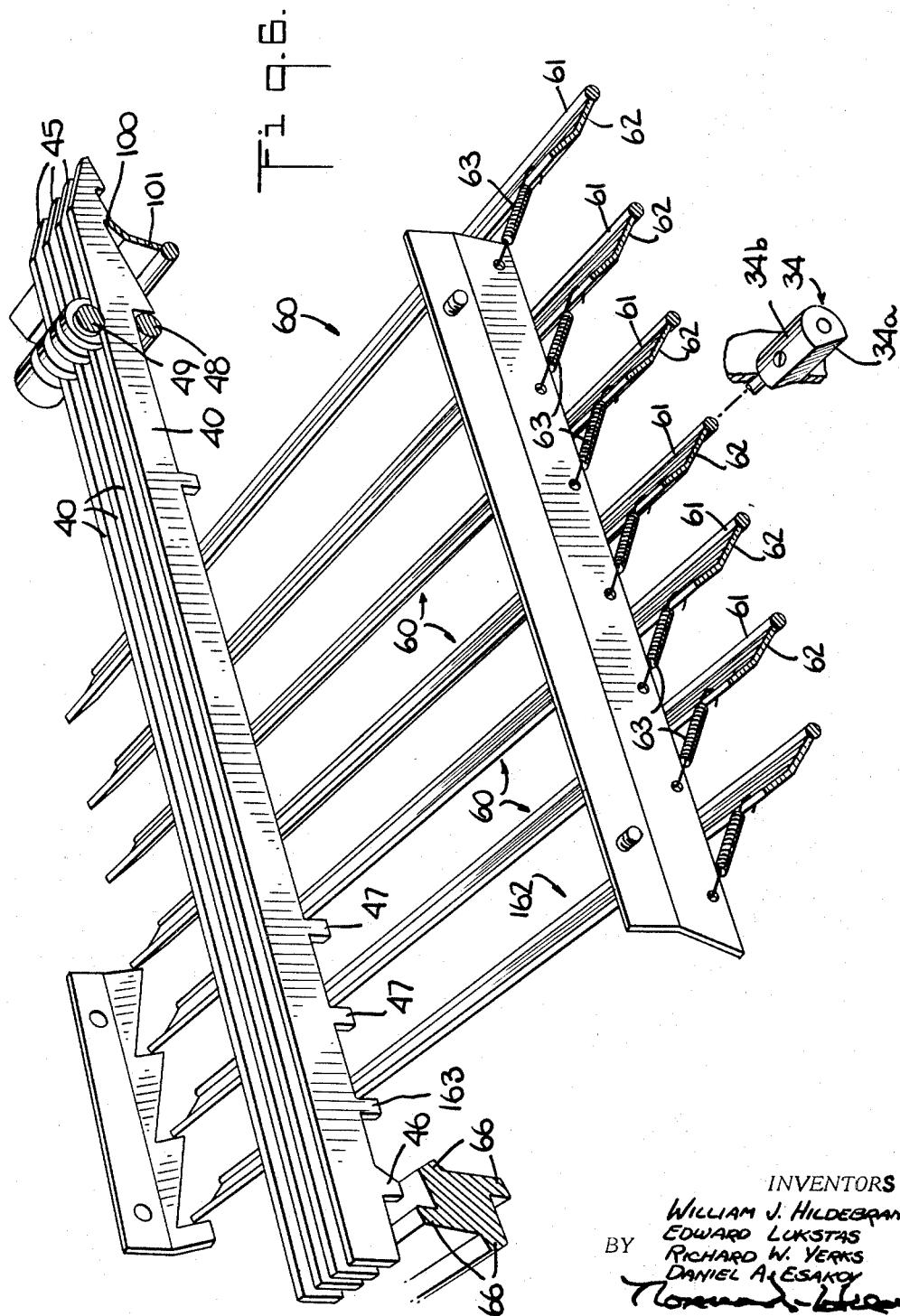

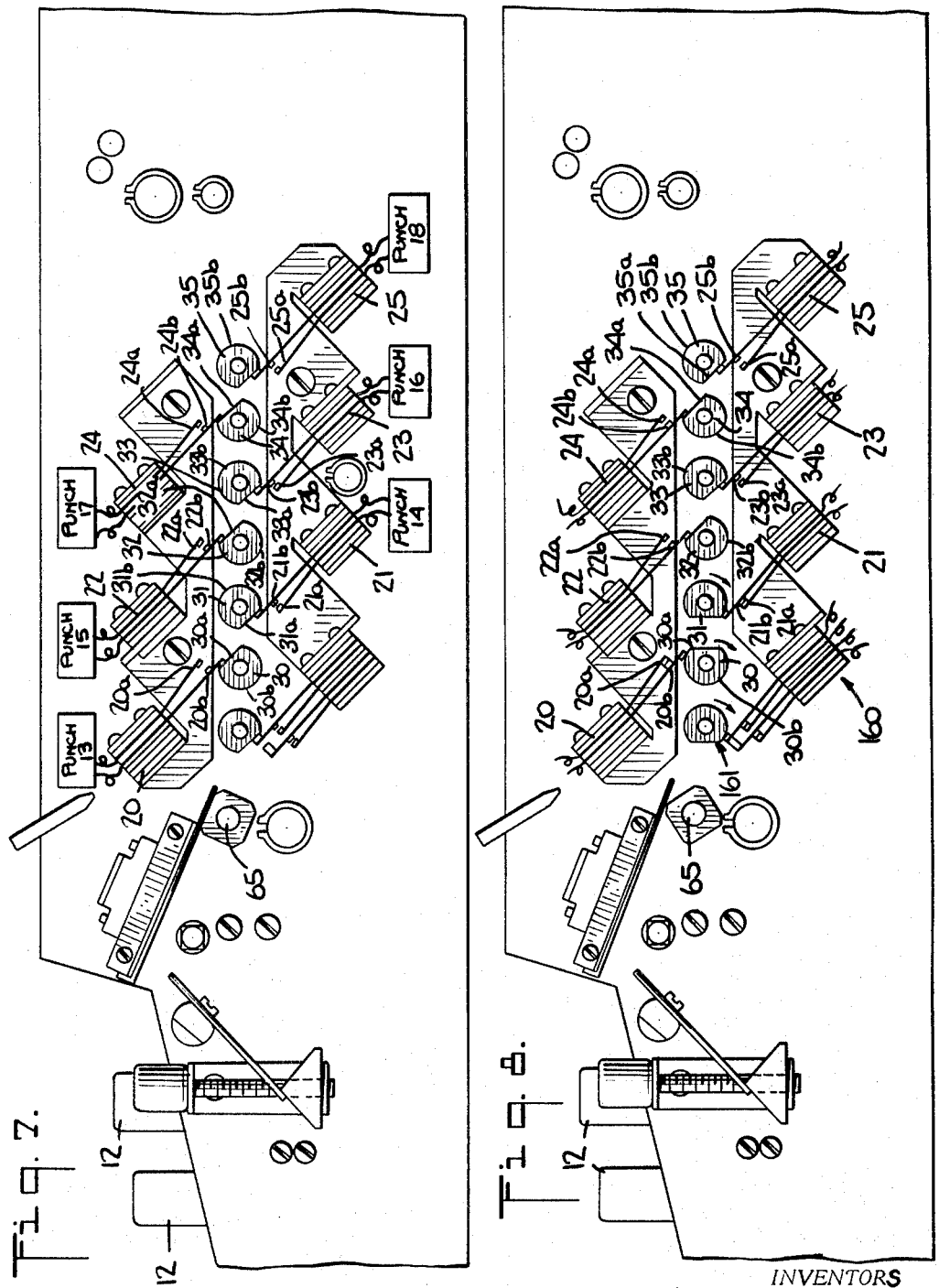

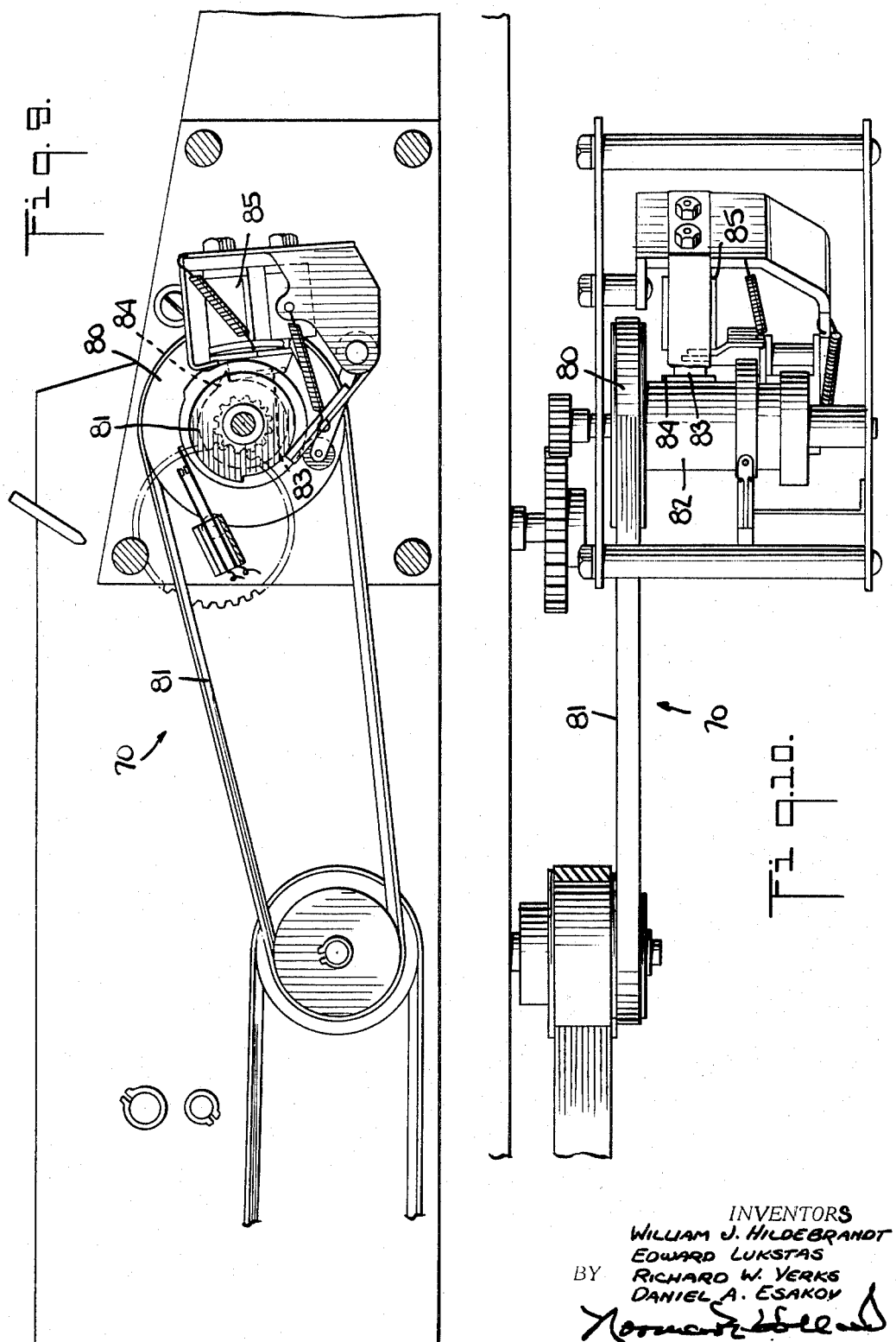

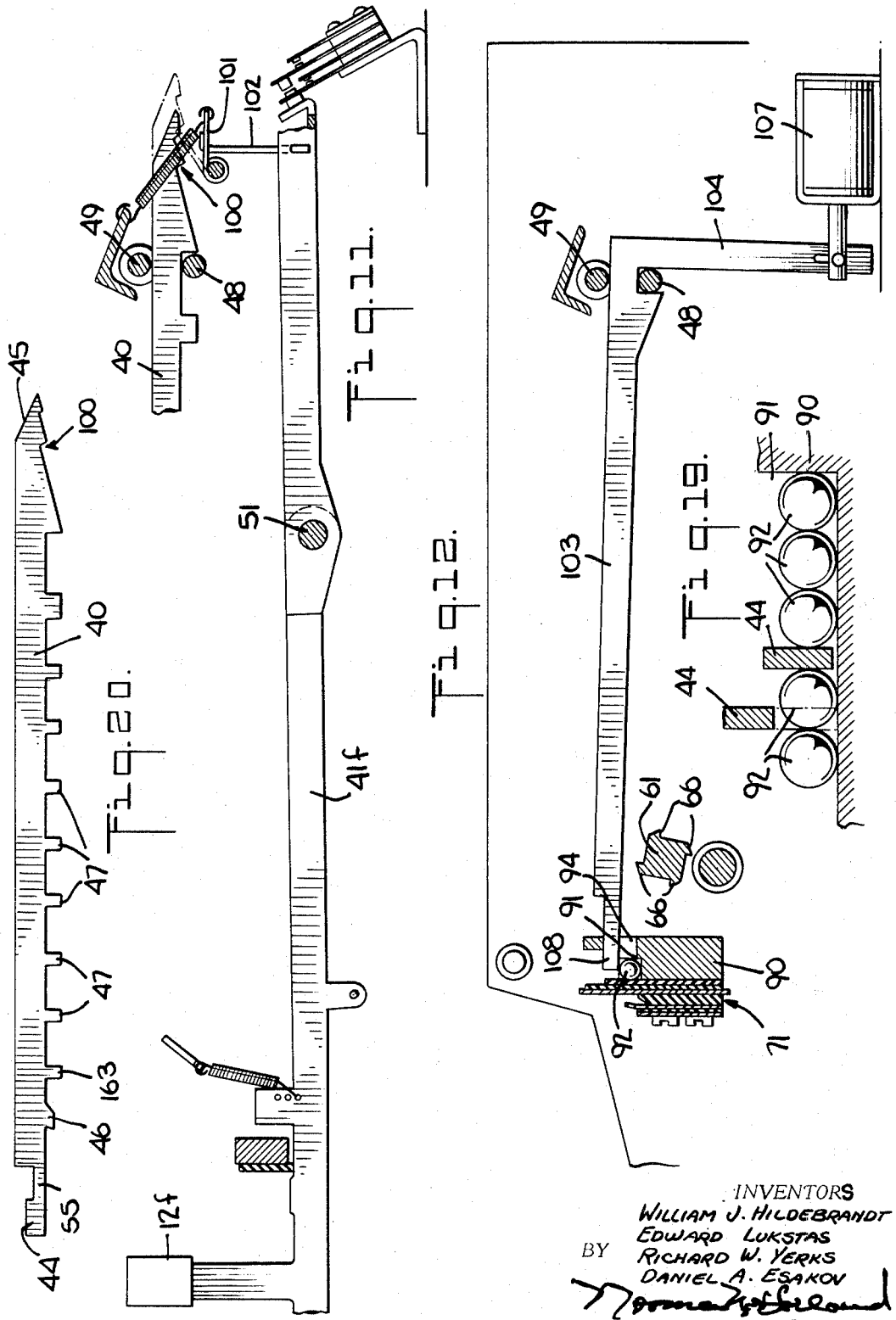

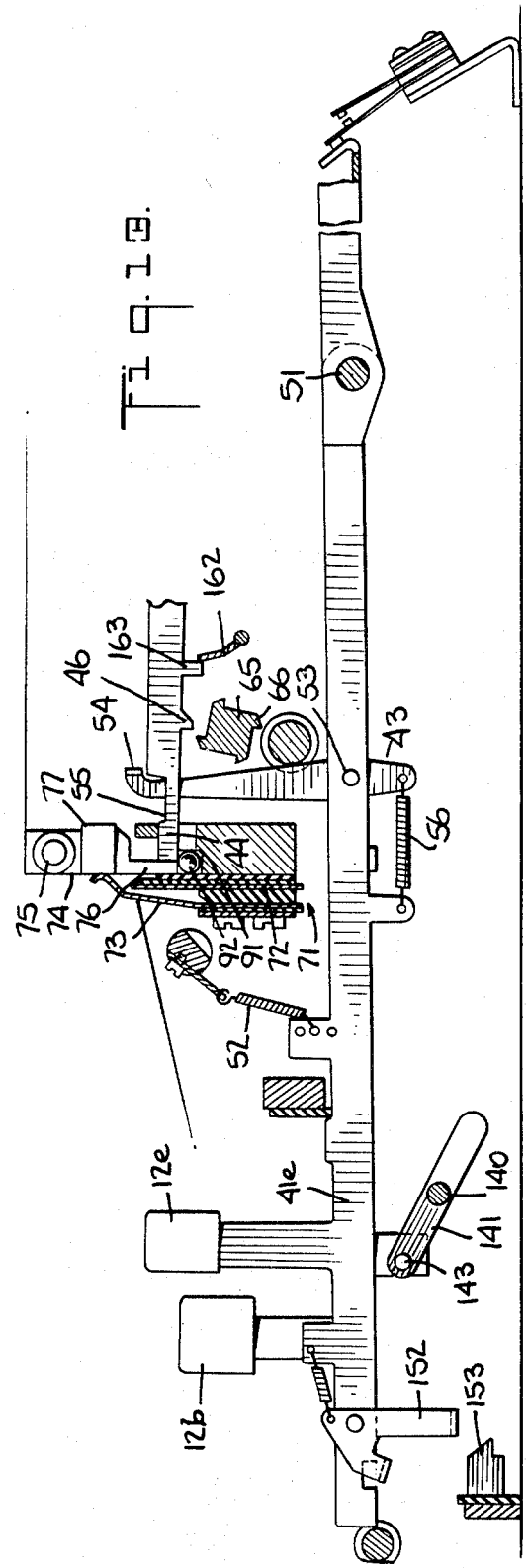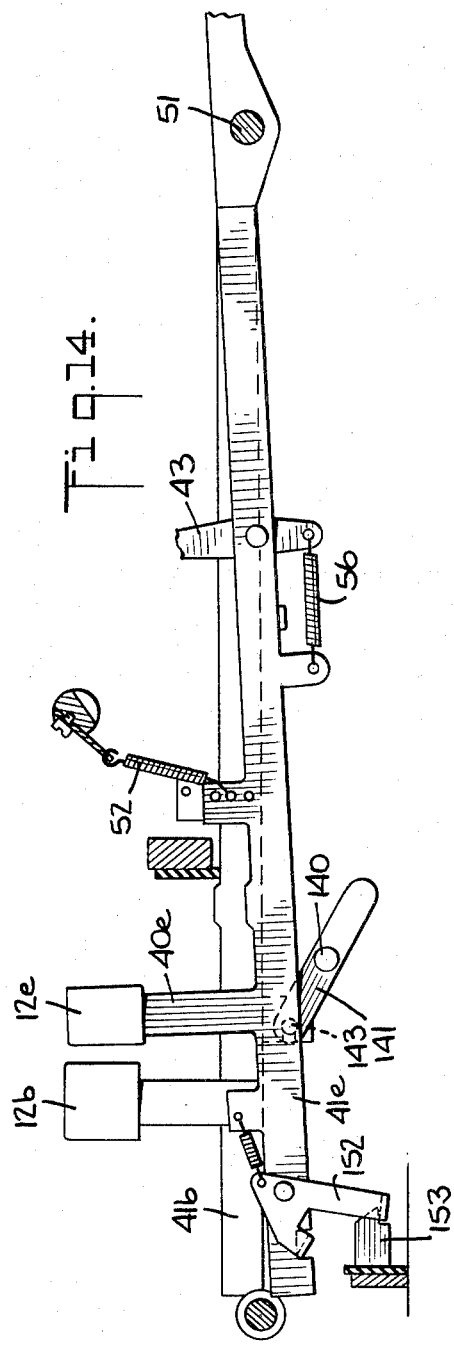

3,386,650
CONTROL MECHANISM
William J. Hildebrandt, Weatogue, Edward W. Lukstas, Windsor, Richard W. Yerks, Manchester, and Daniel A. Esakov, West Hartford, Conn., assignors to Powers & Eaton Industries, Inc., South Hackensack, N.J., a corporation of New Jersey
Filed Sept. 3, 1965, Ser. No. 484,969
34 Claims. (Cl. 234—123)

ABSTRACT OF THE DISCLOSURE

The present invention is directed to an improved perforating mechanism operable through a keyboard which has a plurality of code slides which are actuated upon depression of a key. Upon actuation of the code slide means are energized to rotate a code slide advancing means. The code slide advancing means moves the code slide forward to energize a circuit for actuating the perforator. Each code slide has a predetermined number of code fingers therein so that actuation of a single code slide will actuate a predetermined combination of code switches to apply a predetermined combination of data openings on a tape.

---

The present invention relates to an improved keyboard mechanism and more particularly to an improved keyboard mechanism for controlling a data-applying mechanism, such as a perforator.

In automated machinery, such as automated controls for linecasting machines and the like, it has become common practice to control the linecasting machines by using a perforated tape having predetermined lines of code openings referred to usually as code combinations. Each line of perforations on a tape is adapted to control a function of the machine. The tape is passed through a tape reader which senses the code combinations on the tape and passes this information on to the linecasting machine in order to cause the machine to operate.

The perforations, openings or code combinations in the tape are formed or punched by a punch which is controlled by a keyboard. The operator of the keyboard presses the various keys on the keyboard to operate the dies of the perforator and apply the code combinations or other data on the tape.

It is an object of the present invention to provide an improved keyboard mechanism for controlling a perforator which will permit faster operation.

Another object of the present invention is the provision of a keyboard mechanism which may be operated simply with a minimum of maintenance.

Another object of the present invention is the provision of an improved keyboard mechanism for controlling a perforator which will prevent two keys from being depressed.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a schematic perspective view showing the keyboard mechanism of the present invention;

FIG. 2 is a sectional view taken along the line 2—2 of FIG. 1 showing the spring contact elements of the keyboard;

FIG. 3 is a sectional view taken along line 3—3 of FIG. 2 showing the normal position of one of the code slides used in the present invention;

FIG. 4 is a view similar to FIG. 3 showing the position of a selected code slide after a key has been depressed;

FIG. 5 is a view similar to FIG. 4 showing the selected code slide being moved forward to control the punch mechanism;

FIG. 6 is a schematic perspective view showing the mechanism actuated by the code slides for actuating code switches;

FIG. 7 is a schematic end view of the code switches and the code cams which control the code switches;

FIG. 8 is a schematic end view similar to FIG. 7 showing the code switches being closed by their respective code cams;

FIG. 9 is an end view of the clutch mechanism used in connection with the present invention;

FIG. 10 is a top view of the clutch mechanism shown in FIG. 9;

FIG. 11 is a schematic side view of repeat mechanism of the present invention;

FIG. 12 is a schematic side view of a keyboard locking mechanism for some of the cycles of the machine of the present invention;

FIG. 13 is a schematic side view showing a shift and unshift mechanism of the present invention;

FIG. 14 is a view similar to FIG. 13 showing the shift lock mechanism;

FIG. 15 is a diagrammatic perspective view of the shift and unshift mechanism shown in FIGS. 13 and 14;

FIG. 16 is a diagrammatic side view showing the elevate return lock mechanism;

FIG. 17 is a schematic perspective view showing the keyboard mechanism of the present invention;

FIG. 18 is a plan view of the tape which is formed by the present invention;

FIG. 19 is a sectional diagrammatic view showing the locking mechanism of the present invention; and FIG. 20 is a side view of a code slide used herein.

As shown in the drawings and particularly in connection with FIG. 18, the tape 1 used for controlling an automatic machine, such as a line-casting machine, comprises a plurality of code combinations, in the form of perforations or code openings 2, 3, 4, 5, 6 and 7, and a centrally located feed hole 8 which may be used for feeding the tape or may be used as a pulsing opening. Any combination of code openings 2 to 7 may be formed on each line of the tape, according to a predetermined code, and each line of code openings 2 to 7 is adapted to be fed to a tape reader (not shown), which reads the tape 1 and actuates a control mechanism which enables a machine, such as linecasting machine, to perform some function.

The code openings 2 to 7 on the tape 1 are formed by a mechanism, such as a perforator unit 10 (FIG. 1), which is controlled by a keyboard mechanism 11 having a plurality of keys 12 and a space bar 19.

The perforator unit 10 comprises a plurality of punches 13, 14, 15, 16, 17 and 18 adapted, when depressed, to punch the code openings 2 to 7 in tape 1 and a central feed punch 19 which forms the so-called "feed" hole 8. The punches 13 to 18 are controlled by any suitable means, such as solenoids (not shown), which when energized will depress the punches 13 to 18 or any combination thereof. As is well known in the art. when a key 12 is depressed, a predetermined number of punches 13 to 18 are actuated and depressed to form a particular code combination of code openings 2 to 7 on tape 1. The central punch 19 is always depressed so that a feed hole 8 is formed with every cycle.

It will be understood that the perforator unit 10 is shown in the drawings in schematic fashion for illustrative purposes only and that any perforator unit 10 or any other unit for applying data on the tape may be used with the present invention.

The mechanism for depressing the punches 13 to 18 is controlled by a plurality of code switches 20, 21, 22, 23, 24 and 25 (FIGS. 7 and 8), which comprise stationary contacts 20a, 21a, 22a, 23a, 24a and 25a and movable contacts 20b, 21b, 22b, 23b, 24b and 5b, respectively. The code switches 20 to 25 are connected to the mechanism for depressing punches 13 to 18, respectively (as illustrated diagrammatically in FIG. 7) by any suitable means such as by electrical connections in series.

The movable contacts 20b to 25b are controlled respectively, by code cams 30, 31, 32, 33, 34 and 35 having flat inactive surfaces 30a, 31a, 32a, 33a, 34a and 35a and curved active surfaces 30b, 31b, 32b, 33b, 34b and 35b, respectively, which in turn are rotated by the keyboard control mechanism 11 as will be pointed out in greater detail hereinafter. When a key 12 is depressed the keyboard control mechanism will cause a predetermined number of the code cams 30 to 35 to rotate so that the movable contacts 20b to 25b will be moved by the circular active surfaces 30b to 35b of said predetermined code cams 30 to 35 to close any combination of code switches 20 to 25. These in turn actuate the punches 13 to 18 which they control to form a predetermined number of the code openings 2 to 7 on the tape 1. In the particular example shown in FIGS. 7 and 8, code cams 30 and 31 are rotated so that the movable contacts 20b and 21b of code switches 20 and 21 are moved by the active cam surfaces 30b and 31b of code cams 30 and 31 into electrical engagement with the stationary contacts 20a and 21a to close the circuit of the mechanism for controlling punches 13 and 14 to thereby depress these punches and form perforations 2 and 3 on the tape. It will be understood that depending on which key 12 is depressed any combination of code cams 30 to 35 may be rotated so as to depress any combination of punches 13 to 18 and thus form any combination of code openings 2 to 7 on the tape 1.

The improved keyboard mechanism 11 comprises a plurality of code slides 40 (FIGS. 3 to 6 and 20) each of which is actuated by keys 12 through the intermediation of key lever 41 and key lever latch 43. Each code slide 40 has a locking tail 44, a forward nose 45, a slide-advancing tooth 46 and a plurality of code fingers 47 depending therefrom. The code slide 40 is slideably mounted between shafts 48 and 49 and is spring biased in an upward position by a spring 50.

Each key lever 41 is pivoted at 51 and has an upwardly extending arm 42 on which the key 12 is mounted. Each key lever 41 is spring-biased in an upward position by spring 52. Each key lever latch 43 is pivotally mounted on the key lever 41 at 53 and has an upper toe 54 which overlies the top edge of the code slide 40 adjacent the slot 55 in code slide 40. The key lever latch 43 is spring pressed by spring 56 so that the toe 54 is biased in a forward position and is provided with a rear stop 57 underlying the key lever 41 to prevent it from pivoting in a forward direction.

It will thus be seen that when the key 12 is depressed, the key lever 41 pivots downwardly around pivot 51 carrying its associated key lever latch 43 with it which in turn pulls its associated code slide 40 downwardly by means of upper toe 54. The key lever 41 then returns to its upward position under the influence of spring 52.

The code cams 34 are rotatable by elongated bales 60 (FIG. 6) each of which comprises a shaft 61 and an arm 62. Each code cam 34 is operatively associated with a bale 60 so that when the bales 60 are rotated its associated code cam 34 is also rotated. The bales 60 are spring biased in a rearward inactive position by springs 63 and have their arms 62 normally in front of the path of code fingers 47 on code slides 40.

A rotatable drive shaft 65 having advancing arms 66 is provided and is adapted to be rotated when a key lever 41 is depressed by a key 12. During rotation of the drive shaft 65, one of the advancing arms 66 will strike the slide-advancing tooth on the code slide 40 to move the code slide 40 forward.

It will thus be seen that when a key lever 41 is depressed by the key 12, a predetermined code slide 40 will be depressed by the key lever latch 43. This will bring the code fingers 47 of the code slide directly in front of the arms 62 of the bales 60. Simultaneously therewith the drive shaft 65 will rotate so that one of its arms 66 will strike the advancing tooth 46 on the code slide to move the code slide 40 forward. During its forward motion the code fingers 47 of code slide 40 will strike the arms 62 of the particular bales 60 which are in their path to rotate the shafts 61 which in turn will rotate the code cams 34 associated with said shafts 61. This will close the code switches 20 to 25 to energize the mechanism for depressing the punches 13 to 18 of the perforating mechanism 10 to punch holes 2 to 7 on the tape 1.

It will be observed that a code slide 40 may have as many code fingers 47 depending therefrom as there are bales 60 and that a particular combination of code fingers 47 will actuate only a predetermined combination of bales 60 to energize a predetermined number of code switches 20 to 25 and thus actuate a predetermined number of punches 13 to 18 in the perforator.

Since each code slide 40 has a different combination of code fingers 47 it will be understood that the depression of a single key 12 will cause only a predetermined combination of code switches 20 to 25 to depress a predetermined number of punches 13 to 18 to form the various combinations of code openings on the tape. For example, in FIG. 20, a code slide 40 is shown having six code fingers 47. Thus if this code slide 40 were actuated, all of the punches 13 to 18 would be depressed. However the code slide 40 shown in FIGS. 3 to 6, has two code fingers 47 only so that switches 20 and 21 only are energized and punches 13 and 14 only are depressed and two code openings 2 and 3 are formed in the tape. It will be understood that any combination of code fingers may be utilized to form a code combination of openings on the tape 1.

The drive shaft 65 is rotated by a clutch mechanism 70 (FIGS. 9 and 10) which is energized by the depression of key 12 through control switch 71 and which will be described in greater detail hereinbelow. The control switch 71 (FIG. 2) comprises an elongated stationary contact 72 and a plurality of movable contacts 73, each movable contact 73 is associated with a single code slide 40 and both are on the same axis. The movable contacts 73 are held away from the stationary contact 72 by the locking tail 44 of its associated code slide 40 through a code latch 74 which is pivotally mounted on a shaft 75 and has a dependent finger 76. The locking tail 44 of each code slide 40 normally lies in front of the finger 76 of associated code latch 74 (FIG. 3) and holds the code latch 74 in a retracted position. The code latch 74 has insulation 77 and holds the spring contact 73 of the control switch 71 normally away from stationary contact 72.

However, when a key 12 is depressed and the code slide 40 is depressed, through the intermediation of the key 41 and the key lever latch 43 (FIG. 4), the locking tail 44 of the code slide 40 is moved downwardly out of the path of the depending finger 76 on the code latch 74. The code latch 74 therefore pivots forward under the force of the movable spring contact 73 and its depending finger 76 is positioned on top of the locking tail 44 of the code slide 40 to hold the code slide 40 in a depressed position. Simultaneously the movable spring contact 73 engages the stationary contact 72 of the control switch 71 which activates the clutch 70 to start rotation of the drive shaft 65.

As explained above the rotation of the drive shaf 65 moves the code slide 40 forward through advancing arm 66 on shaft 65 and advancing tooth 46 on code slide 40 so that the particular bales 60 controlled by code fingers 47 of the code slide being moved closes the code switches 20 to 25 associated with the bales to actuate the punches 13 to 18 controlled thereby and punch the openings on the tape. When the locking tail 44 of the code slide 40 is moved beyond the depending finger 76 (FIG. 5) of the code latch 74 (at which point the proper code switches 20 to 25 have been closed) it will be moved upward and rearwardly by spring 50 to pivot the code latch 74 rearwardly back to its original position (FIG. 3) and at the same time push the spring contact 73 away from the stationary contact 72 to break the circuit to the clutch 70.

The code latch 43 is spring pressed at 56 so that even though the operator inadvertently keeps a key 12 depressed, the code slide 40 will be permitted to return to its original position at the end of a cycle.

The clutch 70 shown in FIGS. 1, 9 and 10 comprises a rotatable wheel 80 driven continuously by a motor (not shown) through a pulley 81 and a drum 82 which is operatively connected to the drive shaft 65. The drum 82 is prevented from rotating by stop 83 which normally lies in a path of a dog 84 on the drum 82 and which is controlled by solenoid 85. When a key is depressed, the engagement of movable contact 73 with stationary contact 72 of control switch 71 closes the circuit to the solenoid 85 to energize it and pull the stop 83 away from the dog 84 to permit the drum 82 to rotate one revolution; i.e. until the dog 84 again strikes the stop 83.

The drive shaft 64 is rotated one quarter of a turn to move the code slide 40 forward by means of one of its advancing arms 66 striking the advance tooth 46 of the code slide. While the drive shaft 65 is shown as having four advancing arms 66 and will rotate one quarter turn with each cycle, it will be understood that the drive shaft 65 may have any number of advancing arms 66 and be rotated in inverse proportion to the number of arms 66 on drive shaft 65.

A locking mechanism (FIGS. 17 and 19) is provided which will prevent other code slides 40 from being depressed when one code slide 40 has been depressed. This locking mechanism comprises a housing 90 having an elongated cavity 91 to receive a plurality of ball elements or bearings 92. The length of the cavity 91 in housing 90 is sufficient to receive all the ball bearings 92 plus the thickness of one code slide 40. The locking tail 44 of code slide 40 is positioned in slits 94 in housing 90 which communicates with cavity 91. When a code slide 40 is depressed by key 12, its locking tail 44 is moved down between adjacent ball bearings 92 to fill the entire space of the housing cavity 91. Thus even if another key is inadvertently depressed, a code slide cannot be forced between the ball bearings 92 since there is no room in the cavity 91. In this manner the keyboard is locked until the completion of a cycle; i.e. until the code slide 40 is moved forward to close the code switches and its locking tail 44 moves out from between the ball bearings 92.

The forward end of each code slide 40 has a repeat lock hook 100 thereon which is locked in place by a repeat lock bale 101 (FIG. 11). This is operated by one of the keys 12f of the keyboard 10 through repeat key lever 41f of link 102 connected to repeat bale 101. When a character is to be repeated, the key 12f is depressed. This rocks repeat key lever 41f around shaft 51 so that the bale 101 is pivoted into an upper position by link 102 to catch the repeat hook 100 of a particular code slide 40 and lock it in place; i.e. the code slide 40 is prevented from returning to its original position so that the same character is repeated with each cycle of the machine without the necessity of striking the same key.

In addition the front nose 105 of each code slide 40 may be used to close a switch 106 (FIG. 5) to actuate other functions of the machine, if desired.

Furthermore, during the repeat cycle, or if a tight line code is to be put into the tape 1, an automatic interlock slide 103 is operated as shown in FIG. 12. This interlock slide 103 has a rocking arm 104 which is operated by a solenoid 107. When actuated the solenoid 107 rocks slide 103 around shaft 48 so as to push the locking end 108 of slide 103 between the ball bearings 92 to lock the keyboard in position.

A return elevate key interlock mechanism is provided (FIG. 16) which locks a key lever 41a in place. The key lever 41a has a pin 130 extending therefrom and located below this pin 130 is a pivoted lock arm 131 having a notch 132. The arm 131 is attached to a wire 133 controlled by a solenoid 134. When the solenoid 134 is energized it pulls the wire 133 and the lever 131 is raised so that the notch 132 underlines pin 130 thus preventing key lever 41a from being depressed.

An automatic shift and unshift mechanism is shown in FIGS. 13 to 15. Two shift key levers 41b and 41c are provided and are interconnected by a shaft 140 and have arms 141 and 142 extending therefrom at opposite ends thereof. Arm 141 has a pin 143 which cooperates with a finger 144 depending from the shift key lever 41b and arm 142 has a pin 145 operated by a finger 146 depending from the shift key lever 41c. Thus when either the shift key levers 41b or 41c are depressed the other key lever (either 41b or 41c) will also be depressed and the machine will be placed in the shift region. An unshift key lever 41d is mounted adjacent to shift key lever 41c and is controlled by a pin 147 operated by a finger 148 depending from the unshift key lever 41d and attached to the other arm 148 extending from the shaft 140. The unshift key lever 41d is in a normally depressed position so that normally the machine is in the unshift region. It will be noted that when unshift key lever 41b is in the depressed unshift position, the shift key levers 41b and 41c are in their raised position and when either shift key levers 41b or 41c are depressed, to place the machine in the shift cycle, unshift key lever 41d is automatically raised by arm 148. However, when either of the shift key levers 41b or 41c is released, the unshift key lever 41d is automatically depressed to return the machine to the unshift cycle. Thus, as soon as either shift key lever 41b or 41c is depressed and unshift key lever 41d is raised the machine is placed in the shift cycle (as indicated to the operator by the light 151) and as soon as the unshift key levers 41b or 41c are released, the machine automatically returns to the unshift cycle (as indicated by light 150). Hence the machine may be operated on either the shift or unshift cycle by using only the shift keys and without the necessity of having separate shift and unshifted keys.

In FIGS. 13 and 14 a shift lock is provided in which the shift lock key 40e and its associated key lever 41e has a latch 152 which is adapted to hook into a hook 153 in order to lock the shift key levers 41b or 41c in the shift position.

Referring to FIGS. 6, 7 and 8 it will be noted that a strobe switch 160 is provided which is operated by a strobe cam 161 controlled by a strobe bale 162 adapted to be moved by a strobe finger 136. A strobe finger 163 depends from each code slide 40 so that whenever any code slide 40 is moved forward the strobe switch 160 will be activated. The strobe switch 160 is in series with the code switches 20 to 25 and since the other switches may not operate at the same time the strobe switch 160 completes the circuit so as to compensate for any slight misalignment of the switches 20 to 25.

The operation of the present invention will now be described briefly. The keyboard is normally positioned as shown in FIG. 3. When a key 12 is pressed down its key lever 41 will be depressed thereby depressing its associated code slide 40 through the key lever latch 43. This moves the locking tail 44 of the code slide 40 out of the path of the finger 76 of the code latch 74 and down between the ball bearings 92 in the cavity 91 of the housing 90 to fill the space in the cavity 91 and lock the keyboard in place by preventing additional code slides from being depressed. This permits the movable spring pressed contact arm 73 to move forward into engagement with the stationary contact 72 to close the circuit to the clutch mechanism 70 and at the same time to pivot the code latch finger 76 inwardly so that it lies above the tail end 44 of the code slide 40 to hold the code slide 40 in a depressed position.

With the clutch energized the shaft 65 rotates so that one of its advance arms 66 engages the advance finger 46 of the code slide 40 to move the code slide forward. The code fingers 47 engage the arms 62 of the bales 60 controlled by the code fingers 47 to thereby rotate the arms and their associated code cams 30 to 35 to close any one of the code switches 20 to 25 and thereby cause the depression of the particular punches 13 to 18 controlled by code switches 20 to 25 to form code openings 2 to 7 on the tape. When the cycle is completed the parts return to their original position as shown in FIG. 3 and the machine is ready for another cycle.

It will thus be seen that with the present invention that the code slide may have any number of code fingers 47 thereon and arranged in a predetermined combination so that any predetermined combination of punches 13 to 18 may be depressed to form any predetermined combination of code openings on the tape.

Hence the present invention provides an improved mechanism for applying data to a tape which may be operated at greater speeds than heretofore possible and which has improved means for locking the keyboard to prevent the machine from operating due to inadvertent striking of additional keys by the operator.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. A keyboard control unit for controlling a mechanism for applying data on a tape comprising a plurality of keys for controlling a plurality of code slides, a plurality of code switches for controlling the operation of said data-applying mechanism, said code slides having code fingers depending therefrom, a predetermined code slide being actuated by a key on said keyboard, means spaced from said keys for moving said predetermined code slide, said code switches being operable by the code fingers on said predetermined code slide to operate said data-applying mechanism.

2. A keyboard control unit for controlling a perforator having a plurality of punches for punching perforations in a tape comprising a plurality of keys for controlling a plurality of code slides, a plurality of code switches for controlling the operation of the punches on said perforator, said code slides having code fingers depending therefrom, a predetermined code slide being actuated by a key on said keyboard, means spaced from said key for moving said predetermined code slide, said code switches operable by the code fingers on said predetermined code slide to operate the punches on said perforator.

3. A keyboard control unit for controlling a perforator having a plurality of punches for punching perforations in a tape comprising a plurality of keys for controlling a plurality of code slides, a plurality of code switches for controlling the operation of the punches on said perforator, said code slides having code fingers depending therefrom, a predetermined code slide being actuated by a key on said keyboard, means spaced from said keys for moving said predetermined code slide, drive means for controlling said moving means, control switch means to actuate said drive means, said code switches being operable by the code fingers on said predetermined code slide to operate the punches on said perforator.

4. A keyboard control unit for controlling a perforator having a plurality of punches for punching perforations in a tape comprising a plurality of code slides, a plurality of keys for controlling said plurality of code slides, a plurality of code switches for controlling the operation of the punches on said perforator, said code slides having code fingers depending therefrom, a predetermined code slide being actuated by a key on said keyboard, means spaced from said keys for moving said predetermined code slide, drive means for controlling said moving means, control switch means to actuate said drive means, said control switch means comprising a stationary contact and a plurality of movable contacts, means for causing said movable contact to move into electrical engagement with said stationary contact to actuate the drive means for moving said code slide, said code switches being operable by the code fingers on said predetermined code slide to operate the punches on said perforator.

5. A keyboard control unit for controlling a perforator having a plurality of punches for punching perforations in a tape comprising a plurality of keys for controlling a plurality of code slides, a plurality of code switches for controlling the operation of the punches on said perforator, said code slides having code fingers depending therefrom, a predetermined code slide being actuated by a key on said keyboard, means spaced from said keys for moving said predetermined code slide, drive means for controlling said moving means, a locking mechanism operable by the position on said predetermined code slide to prevent additional code slides from being actuated, control switch means to actuate said drive means, said control switch means comprising a stationary contact and a plurality of movable contacts, means for positioning said predetermined code slide into position for operating said locking mechanism and for causing said movable contact to move into electrical engagement with said stationary contact to actuate the drive means for moving said code slide, said code switches being operable by the code fingers on said predetermined slide to operate the punches on said perforator.

6. A keyboard control unit as claimed in claim 5, wherein said locking mechanism comprises a housing having a cavity therein, said predetermined code slide being positionable into the cavity, said cavity having locking means therein actuatable by said predetermined code slide which will prevent additional code slides from being positioned in said housing.

7. A keyboard control unit as claimed in claim 6, wherein said cavity has a plurality of movable elements therein, the length of said cavity being substantially equal to the thickness by all of said movable elements and the thickness of said predetermined code slide, whereby positioning of said predetermined code slide into said cavity and between said movable elements will fill the space and prevent other code slides from being positioned therein.

8. A keyboard control unit as claimed in claim 7, wherein said movable elements are balls and wherein said predetermined code slide is positioned between said balls by said key.

9. A keyboard control unit as claimed in claim 8, wherein said code slides normally prevent the movable contacts of the control switch means from engaging the stationary contacts and wherein a predetermined movable contact is released for engagement with said stationary contact when said predetermined code slide is actuated.

10. A keyboard control unit as claimed in claim 9, wherein a pivotally mounted code latch is interposed between said movable contact and said code slide and wherein a predetermined code latch is adapted to pivot by the force of said movable contact when the predetermined code slide is actuated.

11. A keyboard control unit as claimed in claim 10, wherein said predetermined code latch has a finger adapted to overlie said predetermined code slide to prevent it from moving out of said cavity when said code latch is pivoted by said movable contact arm.

12. A keyboard control unit as claimed in claim 11, wherein a key lever latch is positioned between said code slides and the keys on said keyboard so that depression of a predetermined key will depress a predetermined code slide through said key lever latch.

13. A keyboard control unit as claimed in claim 12 wherein a rotatable shaft is provided having an arm which engages said code slide forward.

14. A keyboard control unit as claimed in claim 13, wherein said drive shaft has a plurality of arms extending therefrom.

15. A keyboard control unit as claimed in claim 14, wherein said code slide has an advancing tooth actuated by an arm on said drive shaft.

16. A keyboard control unit as claimed in claim 15, wherein code switches are provided to operate the punches of a perforator and wherein means are provided controlled by the code fingers on said predetermined code slide to close a predetermined number of code switches.

17. A keyboard control unit as claimed in claim 16, wherein said code switches are closed by cams operatively connected to code shafts adapted to be rotated by the code fingers of said predetermined code slide.

18. A keyboard control unit as claimed in claim 17, wherein said code shafts have flags extending therefrom adapted to be engaged by the code fingers of said predetermined code slide.

19. A keyboard control unit as claimed in claim 17, wherein a locking slide is provided positionable between the balls in the cavity to prevent code slides from being actuated during certain functions of the machine.

20. A keyboard control unit as claimed in claim 17, wherein each code slide has a repeat lock hook adapted to permit a pivotally mounted repeat bale extend therein when a character is to be repeated.

21. A keyboard control unit as claimed in claim 17, wherein shift and unshift code slides are provided in which said unshift code slide is normally in raised position and said shift code slide is in depressed position, and wherein means are provided whereby depression of said unshift code slide activates the shift code slide and release of the unshift code slide activates said unshift code slide.

22. A keyboard control unit as claimed in claim 17, in which a strobe switch is provided in circuit with said code switches and which is activated by a strobe finger on said each code slide.

23. A keyboard control unit as claimed in claim 17, wherein a return elevate lock mechanism is provided to prevent actuation of the return elevate code slide.

24. A keyboard control unit as claimed in claim 17, wherein a shift lock mechanism is provided to hold the shift lever in depressed position.

25. A keyboard control unit as claimed in claim 17, wherein a clutch rotates said drive shaft and wherein the clutch is energized by the movable contact of the control switch engaging said stationary contact.

26. A control unit for controlling a mechanism for applying data on a tape comprising a plurality of code slides, actuating means for actuating a determined code slide, a plurality of code switches for controlling the operation of said data-applying mechanism, said code slides having code fingers depending therefrom, means spaced from said actuating means for moving said predetermined code slide, said code switches being operable by the code fingers on said predetermined code slide to operate said data-applying mechanism.

27. A control unit as claimed in claim 26, wherein a locking mechanism operable by the position of said predetermined code slide to prevent additional code slides from being actuated.

28. A control unit as claimed in claim 27, wherein said locking mechanism comprises a housing having a cavity therein, said predetermined code slide being positionable into the cavity, said cavity havng locking means therein actuatable by said predetermined code slide which will prevent additional code slides from being positioned in said housing.

29. A control unit as claimed in claim 28, wherein said cavity has a plurality of movable elements therein, the length of said cavity being substantially equal to the thickness by all of said movable elements and the thickness of said predetermined code slide, whereby positioning of said predetermined code slide into said cavity and between said movable elements will fill the space and prevent other code slides from being positioned therein.

30. A control unit as claimed in claim 29, wherein said movable elements are balls and wherein said predetermined code slide is positioned between said balls by said key.

31. A control unit as claimed in claim 30, wherein control switch means are provided to actuate said code slide moving means and wherein said control switch means comprise a stationary contact and a plurality of movable contacts.

32. A control unit as claimed in claim 31, wherein said code slides normally prevent the movable contacts of the control switch means from engaging the stationary contacts and wherein a predetermined movable contact is released for engagement with said stationary contact when said predetermined code slide is actuated.

33. A control unit as claimed in claim 32, wherein a pivotally mounted code latch is interposed between said movable contacts and said code slides and wherein a predetermined code latch is adapted to pivot by the force of said predetermined movable contact when the predetermined code slide is actuated.

34. A control unit as claimed in claim 33, wherein said predetermined code latch has a finger adapted to overlie said predetermined code slide to prevent it from moving out of said cavity when the code latch is pivoted by said movable contact arm.

References Cited
UNITED STATES PATENTS

| 1,882,859 | 10/1932 | Mills | 234—124 |
| 2,085,120 | 6/1937 | Potts | 234—124 |
| 2,135,220 | 11/1938 | Raggenstein | 234—123 |
| 2,860,708 | 11/1958 | Larson | 234—125 |
| 3,018,948 | 1/1962 | Yamura | 234—123 |
| 3,092,310 | 6/1963 | Flieg et al. | 234—123 |

GERALD A. DOST, *Primary Examiner.*